US012669321B2

(12) United States Patent
Fulford et al.

(10) Patent No.: US 12,669,321 B2
(45) Date of Patent: Jun. 30, 2026

(54) DEVICE AND METHOD FOR DETERMINING WAFER BOW

(71) Applicant: Tokyo Electron Limited, Tokyo (JP)

(72) Inventors: Daniel Fulford, Albany, NY (US);
Mark I. Gardner, Austin, TX (US);
Henry Jim Fulford, Marianna, FL
(US); Anton Devilliers, Albany, NY
(US)

(73) Assignee: Tokyo Electron Limited, Tokyo (JP)

( * ) Notice: Subject to any disclaimer, the term of this
patent is extended or adjusted under 35
U.S.C. 154(b) by 113 days.

(21) Appl. No.: 18/485,762

(22) Filed: Oct. 12, 2023

(65) Prior Publication Data

US 2025/0123090 A1     Apr. 17, 2025

(51) Int. Cl.
*G01B 7/28* (2006.01)
*H03H 11/30* (2006.01)
(52) U.S. Cl.
CPC ..................................... *G01B 7/28* (2013.01)
(58) Field of Classification Search
CPC ... H05K 2203/105; H01L 22/14; H03H 11/30
See application file for complete search history.

(56) References Cited

U.S. PATENT DOCUMENTS

| | | | | |
|---|---|---|---|---|
| 6,120,326 A | * | 9/2000 | Brooks | H01G 4/35 |
| | | | | 333/182 |
| 2006/0211211 A1 | * | 9/2006 | Sandhu | H10D 1/716 |
| | | | | 257/E21.018 |
| 2008/0100989 A1 | * | 5/2008 | Chen | H10D 84/212 |
| | | | | 257/E27.048 |
| 2012/0025851 A1 | * | 2/2012 | Homeijer | G01D 5/2415 |
| | | | | 257/E21.011 |
| 2021/0066265 A1 | * | 3/2021 | Eid | H01G 2/06 |

FOREIGN PATENT DOCUMENTS

JP     2018041080 A  *  3/2018  ........ G03F 7/70525

* cited by examiner

*Primary Examiner* — Huy Q Phan
*Assistant Examiner* — Temilade S Rhodes-Vivour
(74) *Attorney, Agent, or Firm* — Oblon, McClelland,
Maier & Neustadt, L.L.P.

(57) ABSTRACT

An apparatus for measuring bow of a wafer, includes a
substrate holder having a support surface configured to
support a wafer; and a capacitor array unit including a
plurality of electrodes laterally spaced from one another in
the capacitor array unit. Each electrode faces the support
surface and is spaced a respective fixed distance from the
support surface such that each electrode can form a capacitor
with an opposing area of a substrate provided on the support
surface of the substrate holder.

20 Claims, 5 Drawing Sheets

DEVICE AND METHOD FOR DETERMINING WAFER BOW

FIELD OF THE INVENTION

The present disclosure relates to semiconductor fabrication, and, more particularly, to determining wafer bow and characterizing wafer bow.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Semiconductor fabrication involves multiple varied steps and processes. One typical fabrication process is known as photolithography (also called microlithography). Photolithography uses radiation, such as ultraviolet or visible light, to generate fine patterns in a semiconductor device design. Many types of semiconductor devices, such as diodes, transistors, and integrated circuits, can be constructed using semiconductor fabrication techniques including photolithography, etching, film deposition, surface cleaning, metallization, and so forth.

Exposure systems are used to implement photolithographic techniques. An exposure system typically includes an illumination system, a reticle (also called a photomask) or spatial light modulator (SLM) for creating a circuit pattern, a projection system, and a wafer alignment stage for aligning a photosensitive resist-covered semiconductor wafer. The illumination system illuminates a region of the reticle or SLM with a (preferably) rectangular slot illumination field. The projection system projects an image of the illuminated region of the reticle pattern onto the wafer. For accurate projection, it is important to expose a pattern of light on a wafer that is relatively flat or planar, preferably having less than 10 microns of height deviation.

SUMMARY

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

An aspect (1) of the invention includes an apparatus for measuring bow of a wafer, including a substrate holder having a support surface configured to support a wafer; and a capacitor array unit including a plurality of electrodes laterally spaced from one another in the capacitor array unit, each electrode facing the support surface and being spaced a respective fixed distance from the support surface such that each electrode can form a capacitor with an opposing area of a substrate provided on the support surface of the substrate holder.

An aspect (2) includes the apparatus of aspect (1), further including a movement device configured to move at least one of the substrate holder and the capacitor array unit relative to each other.

An aspect (3) includes the apparatus of aspect (1), wherein the plurality of electrodes are provided in a common plane such that the respective fixed distances of each electrode are equal.

An aspect (4) includes the apparatus of aspect (1), wherein the capacitor array unit includes an insulating structure having a first surface facing the support surface and a second surface opposite to the first surface, the insulating structure supporting the plurality of electrodes, and a plurality of signal lines supported by the insulating structure, each signal line being connected to a respective one of the plurality of electrodes.

An aspect (5) includes the apparatus of aspect (4), wherein each of the electrodes includes a capacitor plate provided on the first surface of the insulating structure.

An aspect (6) includes the apparatus of aspect (4), wherein each of the electrodes includes a capacitor plate which is at least partially embedded within the insulating structure.

An aspect (7) includes the apparatus of aspect (4), wherein each of the signal lines is at least partially embedded within the insulating structure.

An aspect (8) includes the apparatus of aspect (1), further including a cable coupled to the capacitor array unit and configured to bundle the plurality of signal lines as an input-output cable for the capacitor array unit.

An aspect (9) includes the apparatus of aspect (1), further including a controller electrically connected to each electrode and configured to be electrically connected to a wafer supported by the wafer support surface.

An aspect (10) includes the apparatus of aspect (9), wherein the controller includes a voltage source configured to provide a voltage to each electrode, and a capacitance measurement device configured to measure a capacitance on each electrode based on a respective voltage provided thereto.

An aspect (11) includes the apparatus of aspect (10), further including a processing unit including a processor and a memory for storing software which, when executed by the processor, calculates a distance from each electrode to an opposing area of a wafer provided on the substrate holder based on a capacitance measured on each respective electrode.

An aspect (12) includes the apparatus of aspect (10), wherein the memory stores software which, when executed by the processor, provides a wafer bow mapping based on the distance from each electrode to the opposing area of a wafer provided on the substrate holder.

An aspect (13) includes the apparatus of aspect (10), wherein the memory stores software which, when executed by the processor, provides a 3D wafer bow mapping based on the distance from each electrode to the opposing area of a wafer provided on the substrate holder.

An aspect (14) includes the apparatus of aspect (10), further including a connecting element configured to electrically connect the capacitance measurement device to a wafer provided on the supporting surface of the substrate holder.

An aspect (15) includes the apparatus of aspect (14), wherein the connecting element includes at least one of the substrate holder in contact with a backside surface of the substrate holder and a contact probe configured to contact a top surface of the wafer.

Another aspect (16) of the invention includes a method of measuring wafer bow including providing a plurality of electrodes each facing a respective area of a wafer surface such that the electrode and respective area form a capacitor, and measuring a capacitance value at each electrode. Also included is calculating a distance from each electrode to its respective area based on the measure capacitance at the respective electrode, and determining a bow of the wafer based on the calculated distances.

An aspect (17) includes the method of aspect (16), wherein the providing includes providing multiple electrodes provided in a grid array.

An aspect (18) includes the method of aspect (16), further including providing a 3D model of the wafer bow based on the calculated distances.

An aspect (19) includes the method of aspect (16), further including controlling a process performed on the wafer based on the determined bow of the wafer.

An aspect (20) includes the method of aspect (16), further including performing a bow correction process on the wafer based on the determined bow of the wafer.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figures 1A, 1B, 1C:
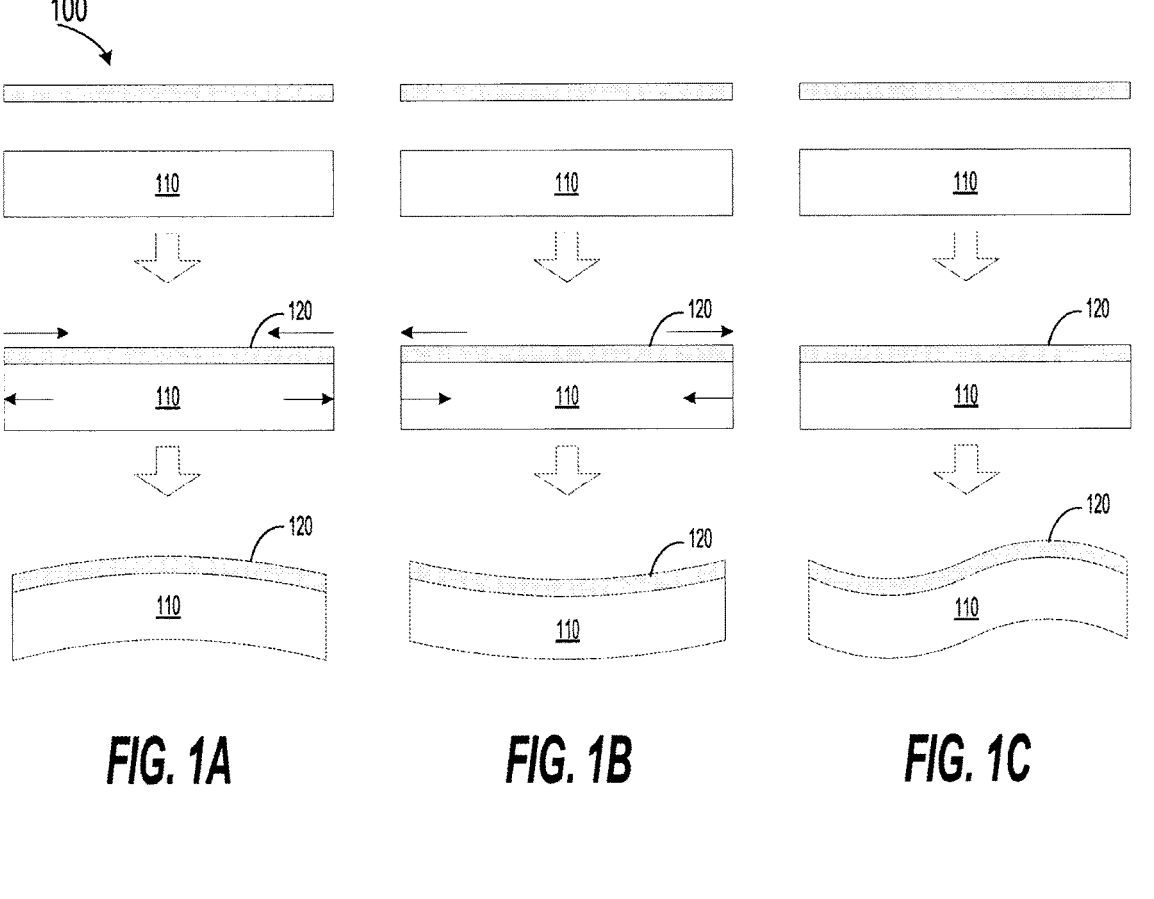
FIGS. 1A to 1C show first and second order bowing of a wafer.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

A functional semiconductor wafer can include the integration of 70+ individual layers that ultimately culminate in functional devices. Each level requires multiple processing steps including, but not limited to thin film deposition, lithography and etches to form the desired structures. For example, microfabrication of a semiconductor structure 100 begins with a flat substrate or wafer 110, as those illustrated in FIGS. 1A to 1C. During microfabrication of the semiconductor structure 100, multiple processing steps are executed that can include depositing material on the wafer 110, removing material, implanting dopants, annealing, baking, and so forth. Different materials and structural formations 120 thus formed can induce non-uniform wafer stresses, which result in bowing of the semiconductor structure 100, which in turn affects overlay and typically results in overlay errors of various magnitudes.

Figures 2A, 2B:
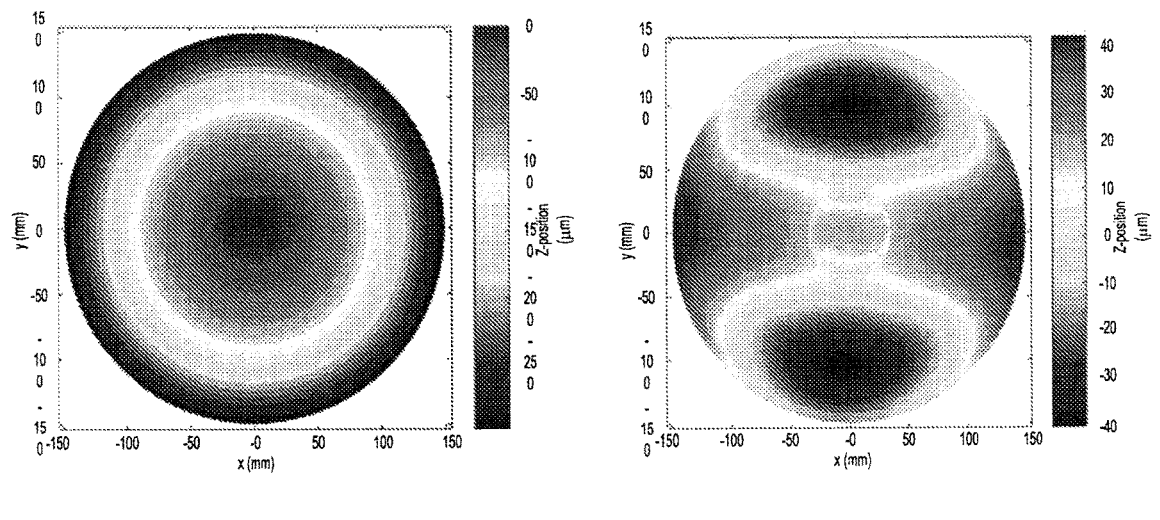
FIGS. 2A and 2B show low order global wafer distortion and high order local wafer distortion, respectively.

For example, FIGS. 1A and 1B show how the different materials and structural formations 120 can either induce a compressive or tensile stress in the wafer 110, respectively, resulting in first order bowing with bow measurements illustrating z-direction height (or z-height) deviations from a reference plane (not shown). As another example, FIG. 1C shows second order bowing of the wafer 110 with two bow measurements identifying positive and negative z-height deviations, respectively. The non-uniform wafer stresses fundamentally distort the wafer grid. These distortions can manifest as low order global spherical type deformations as depicted in FIG. 2A, which shows z-height variations on 300 nm semiconductor wafers. Higher order localized z-height variations may exist as stand-alone distortions or may be embedded in the global signature. An example of a higher order wafer deformation is presented in FIG. 2B.

The data presented is derived from standard semiconductor metrology equipment common to the industry. Laser interferometry is a technique that can be used to measure the warp or bow of a wafer. The basic principle behind this technique is that it measures the changes in the wavelength of light that is reflected off the surface of the wafer. In laser interferometry, a laser beam is split into two separate beams using a beam splitter. One beam is directed at the wafer while the other beam is directed at a reference mirror. Both beams are then reflected back to the beam splitter, where they recombine. When the two beams recombine, they create an interference pattern, which can be detected using a photodetector. This interference pattern will be affected by the warping of the wafer. Specifically, if the wafer is warped, then the reflected light waves will have traveled slightly different distances, resulting in a shift in the interference pattern. By analyzing the interference pattern, laser interferometry can measure the degree of warping in the wafer. Thus, laser interferometry techniques for determining wafer bow require complex hardware and software as well as computing time that reduces measurement throughput. The present inventors have recognized a need for improved systems and methods for determining and characterizing wafer bow.

Techniques herein provide a system and method for determining wafer bow from capacitance measurements at different locations across the wafer. Disclosed embodiments make use of a capacitor structure formed by a measurement electrode and an opposing area of the wafer surface with air between the electrode and wafer surface serving as the capacitor dielectric medium. This novel feature enables calculation of variable distances (i.e. spacing between the electrode and wafer) across the wafer to determine the wafer bow caused by a given process step. Thus, the bow can be calibrated to capacitance both prior and after each wafer processing step, and output can be utilized for processing tools to obtain a more precise wafer surface to enhance wafer patterning. These techniques greatly enhance the ability to obtain precise wafer bow measurements at each step of the wafer fabrication flow. In some embodiments, all capacitors can be measured simultaneously to make out stress regions efficiently and with very good throughput for optimum measurement tool performance.

Figures 3A, 3B:
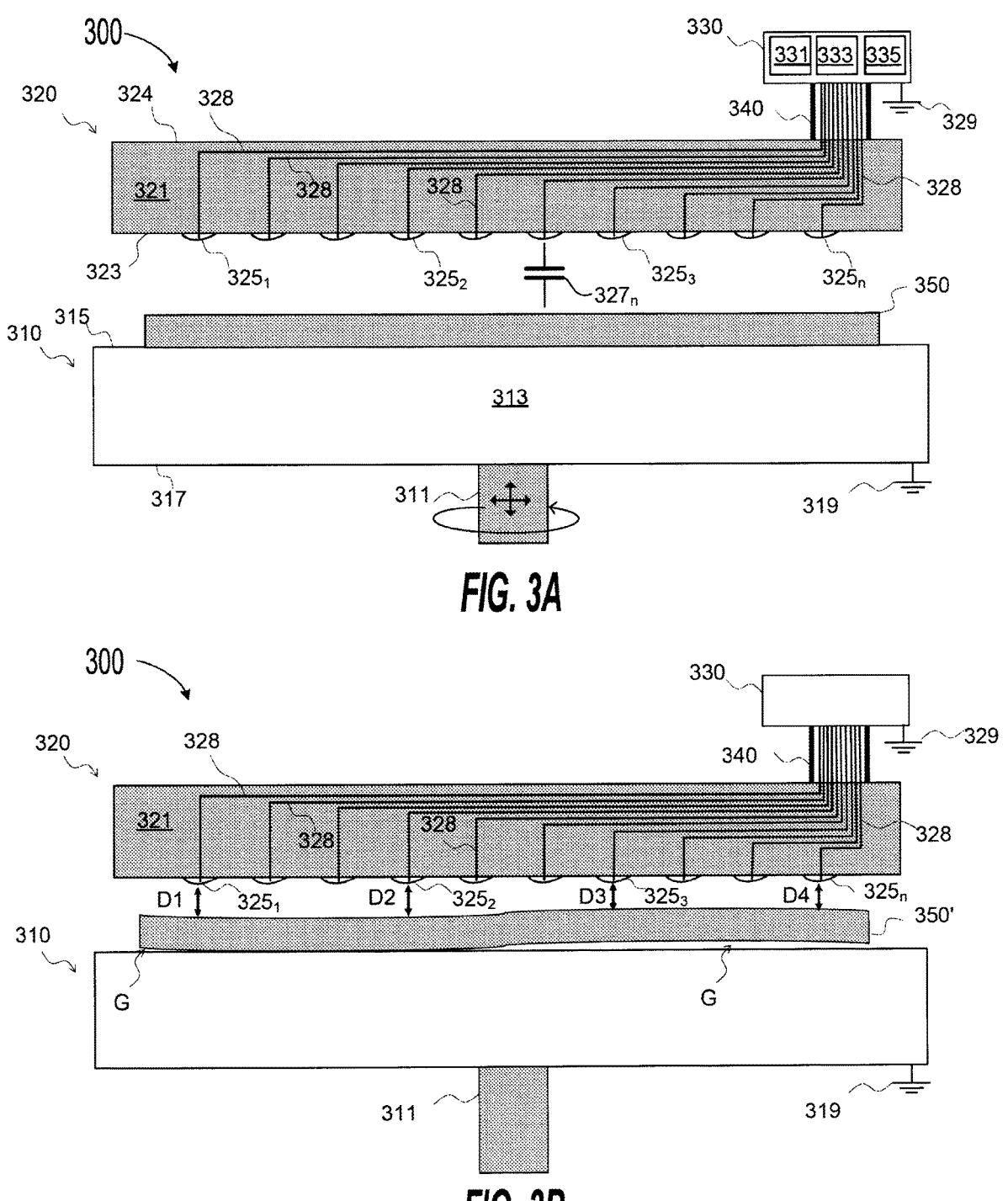
FIG. 3A is a schematic illustration of an apparatus for determining wafer bow according to an example embodiment of the present disclosure.
FIG. 3B is a schematic illustration of the apparatus of FIG. 3A having a bowed wafer therein.

FIG. 3A is a schematic illustration of an apparatus for determining wafer bow according to an example embodiment of the present disclosure. As shown in FIG. 3, the apparatus 300 includes a substrate holder 310 and a capacitor array unit 320. Substrate holder 310 includes a shaft 311 coupled to a support 313 which includes a support surface 315 for supporting a wafer 350 and a surface 317 opposite to the support surface and coupled to shaft 311. A ground connection 319 connected to the surface 317 provides the substrate holder 310 at electrical ground potential.

The capacitor array unit 320 includes an insulating structure 321 having a first surface 323 facing the substrate holder 310 and a second surface 325 which is opposite to the first surface 323. The insulating structure 321 supports a plurality of electrodes 325 laterally spaced from one another and each facing a different area of the support surface 315 of the substrate holder 310. Four electrodes numbered $325_1$, $325_2$, $325_3$, $325_n$ are shown in FIG. 3A for reference. With wafer 350 present on the support 313, each electrode 325 works in conjunction with an area of the wafer 350 directly opposite thereto to form a capacitor with the air gap between the electrode and wafer 350 serving as a dielectric of the capacitor as shown by representative capacitor $327_n$ in FIG. 3A. In the embodiment of FIG. 3A, the plurality of electrodes 325 are provided in a common plane such that the respective fixed distances of each electrode to wafer 350 are substantially equal. The electrodes $325_n$ may be implemented as conductive plates formed on the first surface 323 of the insulating structure 321. Alternatively, a portion or all of each electrode may be embedded within the insulating structure 321.

The capacitor array unit 320 also includes a plurality of signal lines 328 supported by the insulating structure 321, and at least a portion of each signal line 328 may be embedded within the insulating structure 321. A first end of each signal line 328 is connected to a respective electrode 325 while an opposite end of the signal line provided as an output from the capacitor array unit. Thus, the plurality signal lines 328 are routed from the respective electrodes 325 through the insulating structure 321 and out of the insulating structure as shown in FIG. 3A. The insulating structure may be any suitable dielectric material for electrically insulating the signal lines 328 from one another to prevent short circuiting and crosstalk between the signal lines 328.

The substrate holder 310 and the capacitor array unit 320 are preferably movable in relation to one another. Such relative movement may be rotational, horizontal and/or vertical as represented by the directional arrows illustrated for the shaft in FIG. 3A. As would be appreciated by one skilled in the art, relative movement between the substrate holder 310 and the capacitor array unit 320 may be implemented by moving the substrate holder 310, the capacitor array unit 320, or both the substrate holder 310 and the capacitor array unit 320. Thus, the directional arrows adjacent to the shaft 311 represent movement directions for the substrate holder 310 and/or capacitor array unit 320.

In the embodiment of FIG. 3A, a controller 330 is connected to the capacitor array unit 320 by way of a cable 340. More specifically, each of the signal lines 328 is routed in a bundle through the cable 340 to the controller 330 such that circuitry within the controller 330 is electrically connected to each electrode 325. A ground contact 329 is connected to the controller 330 to provide the controller and circuitry therein at electrical ground potential. Cable 340 may be a coaxial cable having a shield that is grounded by way of connecting to the controller 330 and its ground contact 329.

The controller 330 includes a voltage source 331 for providing a voltage on each electrode 325 and a capacitance measurement circuit 333 for measuring a capacitance associated with each electrode 325. The voltage source 331 may provide AC and/or DC voltage of any suitable magnitude and frequency for determining a capacitance value at each respective electrode 325. The capacitance measurement circuit 333 may provide any suitable circuit for determining a capacitance value associated with each electrode 325. In some example embodiments, the voltage source 331 provides a DC voltage to the electrodes 327 and the capacitance measurement circuit 333 may determine the capacitance value by a time constant of the DC current flow through the capacitor. Alternatively, the voltage source 331 may provide an AC voltage to the electrodes 327 and the capacitance measurement device 333 may determine the capacitance value by a capacitive reactance of the capacitor.

The controller 330 also includes a processing unit 335 which includes a processor and a memory. The memory stores software which, when executed by the processor, causes the controller 330 to perform various functions related to detecting and characterizing wafer bow in accordance with the present disclosure. In one example embodiment, the processing unit executes software for calculating a distance from each electrode 325 to an opposing area of a wafer 350 provided on the substrate holder 310 based on a capacitance measured on each respective electrode 325. For example, such distance may be determined from the formula $C=kA/D$, where C is capacitance, A is a cross section area of the capacitor electrode, D is the distance between capacitor electrodes (i.e., the distance between an electrode 325 and the wafer 350), and k is a dielectric constant of the dielectric material between the electrodes of the capacitor. Where the area between the electrodes is pure vacuum, the dielectric constant is 1. In some embodiments, the substrate holder 310 and capacitor array unit 320 are provided within a chamber that can provide a vacuum environment or any suitable gas environment for providing an air dielectric for each capacitor.

As another example embodiment, the processing unit 335 can execute software that provides a wafer bow mapping based on the distance from each electrode 325 to the opposing area of a wafer 350 provided on the substrate holder 310. Such wafer bow mapping may be a 3D model of the wafer bow.

FIG. 3B is a schematic illustration of the apparatus of FIG. 3A having a bowed wafer therein. As shown, a bowed wafer 350' is provided on the support surface of the substrate holder 310 and the substrate holder is provided in a raised position to facilitate measurement of capacitance at each electrode 325. The bowed wafer 350' will present local gaps G under the wafer which results in a variable distance from a top surface of the wafer 350' to the capacitor array unit 320. In the example of FIG. 3B, D1 represents a distance from electrode $325_1$ to the wafer 350', D2 represents a distance from electrode $325_2$ to the wafer 350', D3 represents a distance from electrode $325_3$ to the wafer 350' and D4 represents a distance from electrode $325_n$ to the wafer 350'. As shown, D1, D2, D3 and D4 are different from one another due to the bowed state in wafer 350'.

In operation, the voltage source 331 provides a voltage on each electrode 325 which causes current flow to the grounded wafer 350' directly opposite the electrode 325 and a capacitance measurement is obtained for each electrode by the capacitance measurement device 333. As the distances D1, D2, D3 and D4 are different from each other, the capacitance values of $325_1$, $325_2$, $325_3$, and $325_n$ are also different from each other. With the capacitance value obtained at each electrode 325, the controller can calculate precise distance value for each of D1, D2, D3 and D4, as well as all other electrodes 325 according to the formula discussed above, for example. Such distance values are used to determine whether the wafer is bowed and characteristics of a bow in the wafer. In some embodiments, the controller may construct a 3D model of the bow in the wafer which can be used to control further processing of the wafer 350'. In one example, the wafer bow data may be used to perform bow mitigation processes such as film formation on the wafer 350.

Figure 4:
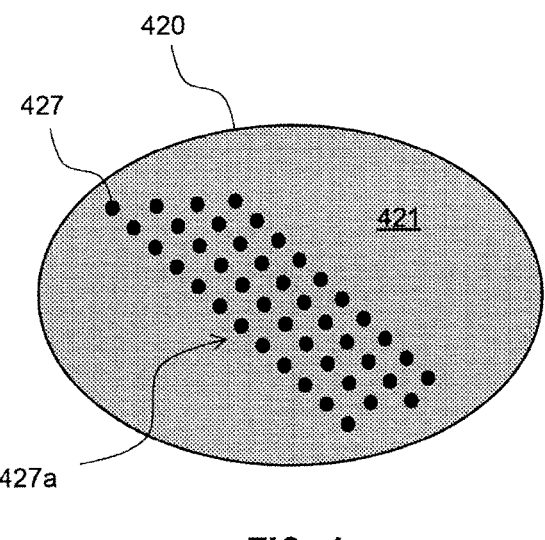
FIG. 4 is a schematic illustration of a capacitor array unit according to an example embodiment of the present disclosure.

FIG. 4 is a plan view of the bottom surface of a capacitor array unit in accordance with one embodiment of the present disclosure. As shown, the capacitor array unit 420 includes an insulating structure 421 with electrodes 427 provided in an electrode grid array pattern 427a. The electrode grid array 427a provides 2D mapping in the XY directions of the surface of a wafer provided on a substrate holder, while the capacitance values enable determining a Z dimension at each electrode. Thus, the electrode grid array 427a enables construction of a 3D model of the wafer bow. The precise number and arrangement of each electrode 427 in the electrode grid array 427a may be determined based on the resolution and throughput of each measurement application. In some embodiments, two electrodes 427 may be sufficient to determine the existence of global bow of a wafer. A larger number of electrodes in the tens of thousands may be used. A very high-density electrode grid array 427a may be provided and the controller 330 may utilize a subset of the electrodes 427 to reduce time for computing the distance and constructing a 3D model of wafer bow, for example.

Figure 5:
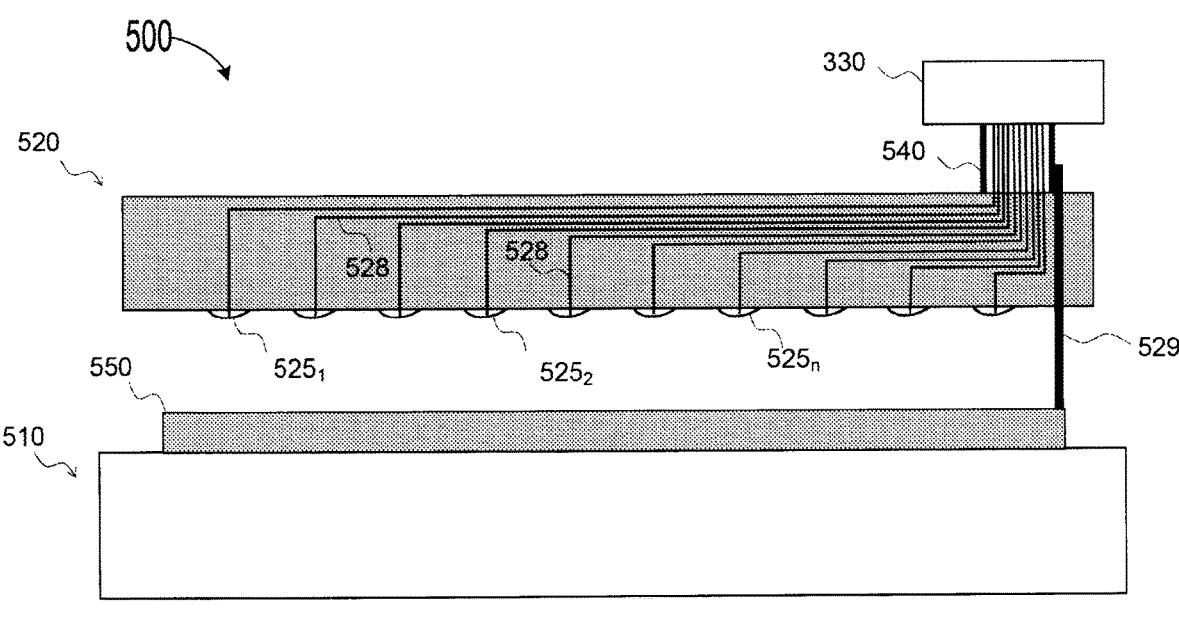
FIG. 5 is a schematic illustration of an apparatus for determining wafer bow according to an example embodiment of the present disclosure.

FIG. 5 is a schematic illustration of an apparatus for determining wafer bow according to an example embodiment of the present disclosure. The apparatus 500 includes a substrate holder 510, a capacitor array unit 520 having electrodes 525 and signal line 528 therein, and a controller 330. In the embodiment of FIGS. 3A and 3B, the wafer is grounded through contact with the substrate holder 310. Such a configuration provides completely contactless determination of wafer bow which reduces generation of particle contaminants. As shown in FIG. 5, the apparatus 500 includes a probe 529 electrically connecting cable 540 to an upper surface of the wafer 550. The probe may be movable in conjunction with movement of the substrate holder 510 and or capacitor array unit 520. The probe 529 may be grounded to ground the wafer 550 or may be a non-ground reference voltage. This use of a probe 529 may provide greater accuracy of capacitance measurements in some applications.

Figures 6, 7:
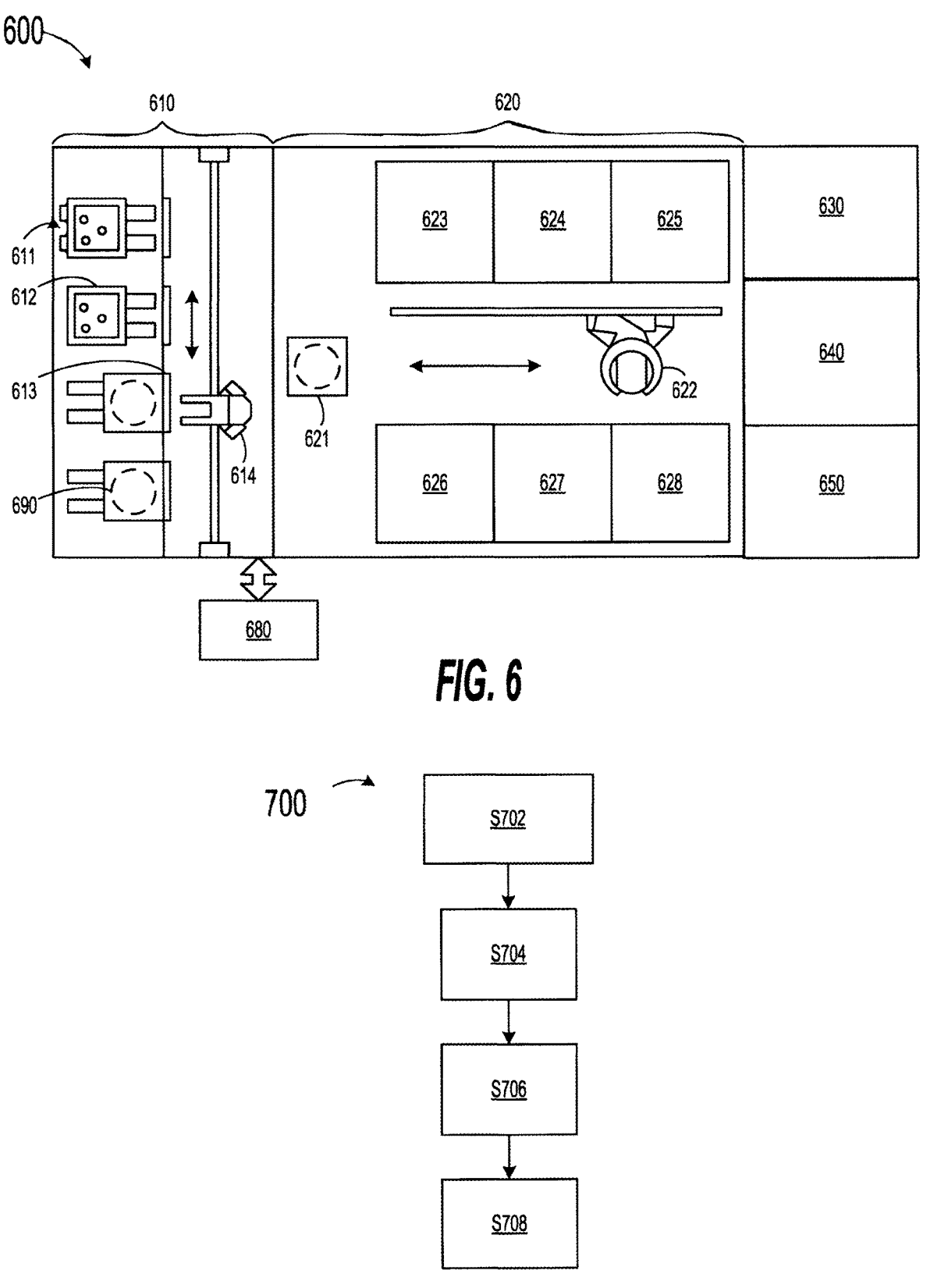
FIG. 6 is a plan view of an exemplary wafer processing system for determining and correcting wafer bow in accordance with some embodiments of the present disclosure.
FIG. 7 is a flow of an exemplary method for determining wafer bow according to an example embodiment of the present disclosure.

FIG. 6 is a plan view of an exemplary wafer processing system 600, e.g., a track lithography tool, for measuring and correcting or modifying wafer bow in accordance with some embodiments of the present disclosure. The wafer processing system 600 includes various wafer handling components or carriers, along with several stages, e.g., a carrier stage 610 and a treatment stage 620. The carrier stage 610 includes one or more pod assemblies 611 that are configured to receive one or more wafer cassettes 612 that are configured to contain one or more wafers 690, e.g., the wafer 110 shown in FIGS. 1A to 1C, that are to be processed in the wafer processing system 600. Doors 613 can open to access the wafers 690 contained in the wafer cassettes 612. A carrier transfer robot 614 can move up and down and transfer the wafers 690 from the wafer cassettes 612 to a shelf unit 621 that is installed in the treatment stage 620 for storing the wafers 690 temporarily.

The treatment stage 620 includes a variety of treatment modules, e.g., treatment modules 623-628, and a treatment transfer robot 622. The treatment transfer robot 622 is configured to access the shelf unit 621 and the treatment modules 623-628 and transfer the wafers 690 among the treatment modules 623-628 for various processing. In an embodiment, the treatment transfer robot 622 can flip and rotate the wafers 690. The modules 623-628 can include one or more metrology modules 623, which are configured to measure an amount of wafer bow of the wafers 690 and provide bow measurements to the wafer processing system 600. The metrology modules 623 may be implemented as an apparatus for determining wafer bow by capacitance measurements as discussed herein, for example the apparatus 300 or the apparatus 500 discussed above. In some embodiments an apparatus for determining wafer bow by capacitance measurements may be used to enhance the metrology modules 623 which can use optical (e.g., using a scanning laser technique), acoustic and other mechanisms to measure the z-height deviations across a surface of the wafer and store the height deviations by (x, y) coordinates to identify a plurality of sub-bow measurements (x, y) of the bow measurement. Bow measurements can include measuring a degree of convexity or concavity, or mapping z-height deviation values on the wafers 690 relative to one or more reference z-height deviation values. In other words, z-height deviation values are spatially mapped, such as with coordinate locations, to identify z-height deviation values across a surface of the wafer 690. Bow measurements and z-height deviation values can be mapped at various resolutions depending on types of metrology equipment used and/or a resolution desired.

The bow measurements can include raw bow data or be represented as a bow signature with relative z-height deviation values. In many embodiments, the reference z-height deviation values may be all close to zero and thus representative of a wafer that is close to being flat. For example, a wafer that is close to being flat or considered flat for overlay improvement herein can be a wafer having an average z-height deviation value of less than 10 microns. In some embodiments, the reference z-height deviation values can represent some non-planar shape, but which shape is, notwithstanding, useful for overlay error correction—especially for particular stages of micro fabrication. Techniques herein enable measurement and correction of bowing that is greater than 10 microns, for example. The metrology module 623 is configured to measure the wafer 690, which has a working surface and a backside surface opposite to the working surface. The wafer 690 may have an initial wafer bow value resulting from one or more micro fabrication processing steps that have been executed to create at least part of a semiconductor device on the working surface of the wafer 690. For example, field-effect transistors (FETs) may be completed or only partially completed on the working surface of the wafer 690.

The treatment modules 623-628 can also include one or more film formation modules 624 that are configured to form one or more films, e.g., a shape control layer, on a surface of the wafer 690 being processed. The film formation module 624 can be configured to deposit a shape control layer on the frontside and/or backside surface of the wafer 690 using chemical vapor deposition, atomic layer deposition, spin-on film deposition process, or other deposition techniques. The film formation module 624 and the metrology module 623 can be installed on a common platform having an automated wafer handling system that automatically moves the wafer 690 from the metrology module 623 to the film formation module 624.

The treatment modules 623-628 can also include one or more bake modules 625 that are configured to bake the wafer 690 to a target temperature. For example, the bake module 625 can bake and stabilize the wafer 690 at 32° C. or 90° C. As another example, the bake module 625 can bake the wafer 690 with a shape control material (e.g., a heat sensitive material) formed thereon using a pattern of heat that correspond to a bow measurement of the wafer 690, to correct or modify an internal stress of the shape control layer. The treatment modules 623-428 can also include one or more radiation sources 626 that are configured to project onto different regions of the shape control material radiations of variable intensities that correspond to the bow measurement of the wafer 690. The treatment modules 623-628 can also include a plurality of heating units 627, which can be installed on a wafer chuck that is used for a wafer to be placed thereon. The heating units 627 can have an arrangement corresponding to a certain pattern of heat and generate different temperature ranges of heat, and the wafer chuck can thus have a plurality of heating zones that correspond to the certain pattern of heat. Accordingly, the shape control material can be heated in different regions that correspond to the certain pattern of heat and its stresses in the different regions can be modified to become compressive, neutral or tensile.

The wafer processing system 600 further includes a controller 680. The controller 680 can be a computer processor located within the wafer processing system 600, or located remotely but being in communication with components, e.g., the metrology module 623, the film formation module 624, the bake module 625, the radiation source 626 and the heating units 627, of the wafer processing system 600. In some embodiments, the metrology module 623 may perform the functions of the controller 330 discussed above. In an embodiment, the controller 680 is configured to control the metrology module 623 to measure a wafer 690 to identify a bow measurement of the wafer 690, receive the bow measurement from the metrology module 623, control the film formation module 624 to form a shape control layer on the backside (or frontside or both) surface of the wafer 690, control the bake module 625 to differentially bake the wafer 690 with the shape control layer formed thereon using a pattern of heat that corresponds to the bow measurement of the wafer 690, control the radiation source 626 to project on different regions of the shape control layer radiations of variable intensities that correspond to the bow measurement of the wafer 690 and/or control the heating units 627 to generate different temperature ranges of heat that correspond to the a certain pattern of heat, to correct or modify the internal stress of the stressor film. The film formation module 624, the bake module 625 and the controller 680 can be referred to as a wafer processing device.

The wafer processing system 600 can also include other stages or components, e.g., a stepper/scanner 630, a singulation device 640 and a bonding tool 650. The singulation device 640 can be configured to dice and singulate a wafer to obtain a plurality of chiplets. The bonding tool 650 is configured to connect (join) an integrated chiplet with a wafer together in one mechanically stable package.

FIG. 7 is a flow diagram of a method for determining wafer bow in accordance with an example embodiment of the present disclosure. The method 700 includes providing a plurality of electrodes each facing a respective area of a wafer surface such that the electrode and respective area for a capacitor. In some embodiments, the plurality of electrodes are provided in a common plane such that the distance between each electrode and its respective area of the wafer surface is equal when the wafer does not have any bow. Multiple electrodes may be provided in a grid array.

A capacitance value is measured at each electrode at S704. In some embodiments, the capacitance measurement is a contactless measurement in which the wafer is grounded through contact with the substrate holder which is at ground potential. In other embodiments, the measurement step 704 includes bringing a grounding probe in contact with a top surface of the wafer.

At S706, a distance from each electrode to its respective area on the wafer is calculated based on the measured capacitance at S706. Wafer bow is then determined based on the calculated distances at S708. In some embodiments, S708 includes providing a 3D model of the wafer bow based on the calculated distances. The determined wafer bow may be used to control a process performed on the wafer, such as a bow correction process to mitigate stresses on the bowed wafer.

Figure 8:
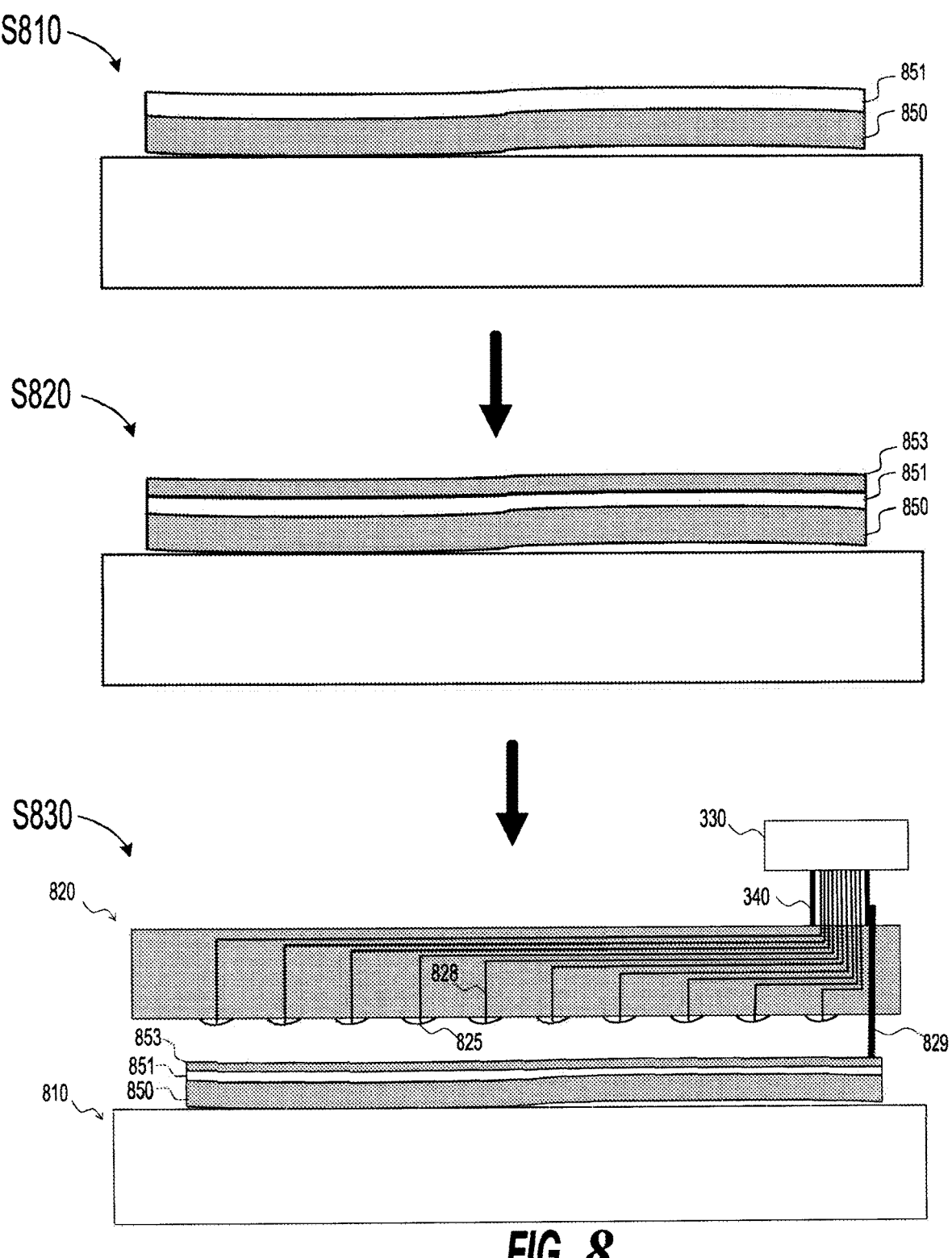
FIG. 8 is a flow of an exemplary method for determining wafer bow according to an example embodiment of the present disclosure.

FIG. 8 shows a process flow of a wafer for which bow is determined in accordance with an example embodiment of the present disclosure. S810 shows a bowed wafer 850 after a process step of forming a dielectric layer 851 thereon. In the embodiment of FIG. 8, a disposable conductive layer 803 is added on the dielectric layer 801 to form an ultra-thin bottom electrode to enable precise capacitance measurements across the wafer as discussed above. In step 830, capacitance measurements are taken by contacting a ground probe 829 to the conductive layer 803. Wafer bow is then determined based on the capacitance measurements. Once the measurements are taken, the conductive layer 803 is removed to provide the wafer as shown in S810, and the wafer 850 is further processed based on the wafer bow determined from the capacitance measurements.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/ or described operations may be omitted in additional embodiments.

"Substrate" or "target substrate" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a dielectric layer on or overlying a base substrate structure such as a thin film. Thus, substrate is not limited to any particular base structure, underlying dielectric layer or overlying dielectric layer, patterned or un-patterned, but rather, is contemplated to include any such dielectric layer or base structure, and any combination of dielectric layers and/or base structures. The description may reference particular types of substrates, but this is for illustrative purposes only.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An apparatus for measuring bow of a wafer, comprising:

a substrate holder having a support surface configured to support a wafer; and a capacitor array unit comprising a plurality of electrodes laterally spaced from one another in the capacitor array unit, each electrode facing the support surface and being spaced a respective fixed distance from the support surface such that each electrode forms a capacitor with an opposing area of a substrate provided on the support surface of the substrate holder.

2. The apparatus of claim 1, further comprising a movement device configured to move at least one of the substrate holder and the capacitor array unit relative to each other.

3. The apparatus of claim 1, wherein the plurality of electrodes are provided in a common plane such that the respective fixed distances of each electrode are equal.

4. The apparatus of claim 1, wherein the capacitor array unit comprises:

an insulating structure having a first surface facing the support surface and a second surface opposite to the first surface, the insulating structure supporting the plurality of electrodes; and a plurality of signal lines supported by the insulating structure, each signal line being connected to a respective one of the plurality of electrodes.

5. The apparatus of claim 4, wherein each of the electrodes comprises a capacitor plate provided on the first surface of the insulating structure.

6. The apparatus of claim 4, wherein each of the electrodes comprises a capacitor plate which is at least partially embedded within the insulating structure.

7. The apparatus of claim 4, wherein each of the signal lines is at least partially embedded within the insulating structure.

8. The apparatus of claim 4, further comprising a cable coupled to the capacitor array unit and configured to bundle the plurality of signal lines as an input-output cable for the capacitor array unit.

9. The apparatus of claim 1, further comprising a controller electrically connected to each electrode and configured to be electrically connected to a wafer supported by the wafer support surface.

10. The apparatus of claim 9, wherein the controller comprises:

a voltage source configured to provide a voltage to each electrode; and a capacitance measurement device configured to measure a capacitance on each electrode based on a respective voltage provided thereto.

11. The apparatus of claim 10, further comprising a processing unit including a processor and a memory for storing software which, when executed by the processor, calculates a distance from each electrode to an opposing area of a wafer provided on the substrate holder based on a capacitance measured on each respective electrode.

12. The apparatus of claim 11, wherein the memory stores software which, when executed by the processor, provides a wafer bow mapping based on the distance from each electrode to the opposing area of a wafer provided on the substrate holder.

13. The apparatus of claim 11, wherein the memory stores software which, when executed by the processor, provides a 3D wafer bow mapping based on the distance from each electrode to the opposing area of a wafer provided on the substrate holder.

14. The apparatus of claim 10, further comprising a connecting element configured to electrically connect the capacitance measurement device to a wafer provided on the supporting surface of the substrate holder.

15. The apparatus of claim 14, wherein the connecting element comprises at least one of the substrate holder in contact with a backside surface of the substrate holder and a contact probe configured to contact a top surface of the wafer.

16. A method of measuring wafer bow comprising:

providing a plurality of electrodes each facing a respective area of a wafer surface such that the electrode and respective area form a capacitor;

measuring a capacitance value at each electrode;

calculating a distance from each electrode to its respective area based on the measured capacitance at the respective electrode; and determining a bow of the wafer based on the calculated distances.

17. The method of claim 16, wherein the providing comprises providing multiple electrodes provided in a grid array.

18. The method of claim 16, further comprising providing a 3D model of the wafer bow based on the calculated distances.

19. The method of claim 16, further comprising controlling a process performed on the wafer based on the determined bow of the wafer.

20. The method of claim 16, further comprising performing a bow correction process on the wafer based on the determined bow of the wafer.

* * * * *